Jan. 19, 1971 M. M. STERNAU 3,555,769
CLOSURE AND METHOD AND APPARATUS FOR MAKING SAME
Original Filed June 15, 1956 5 Sheets-Sheet 1

INVENTOR.
MARTIN M. STERNAU

*INVENTOR.*
MARTIN M. STERNAU

INVENTOR.
MARTIN M. STERNAU

Jan. 19, 1971  M. M. STERNAU  3,555,769
CLOSURE AND METHOD AND APPARATUS FOR MAKING SAME
Original Filed June 15, 1956  5 Sheets-Sheet 4
FIG.13
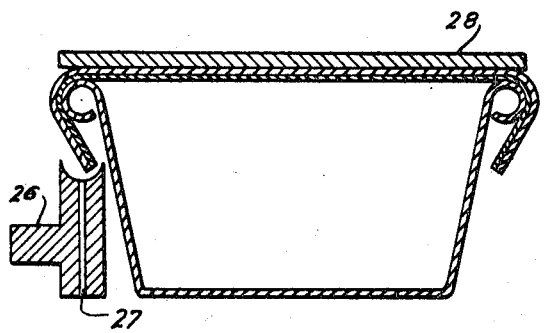
FIG.14
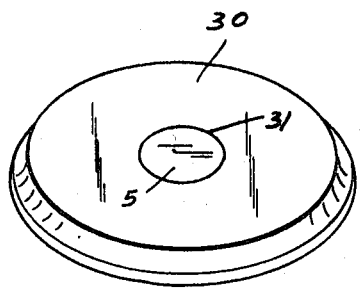
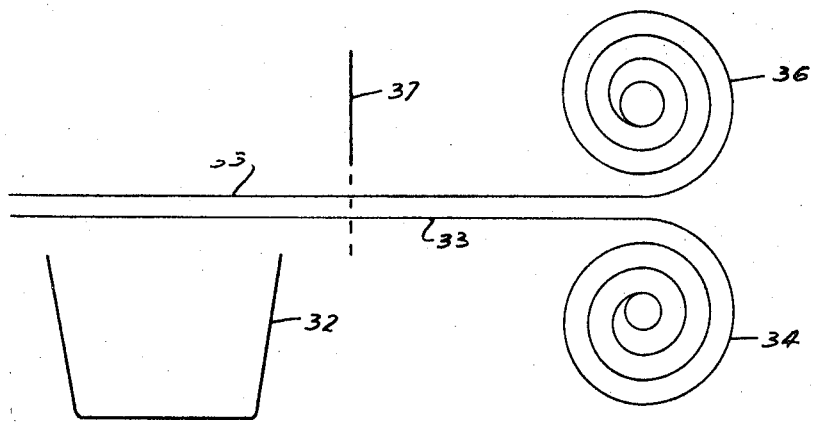
FIG.15
INVENTOR.
MARTIN M. STERNAU Jan. 19, 1971    M. M. STERNAU    3,555,769
CLOSURE AND METHOD AND APPARATUS FOR MAKING SAME
Original Filed June 15, 1956    5 Sheets-Sheet 5

INVENTOR.
MARTIN M. STERNAU

United States Patent Office 3,555,769
Patented Jan. 19, 1971

3,555,769
CLOSURE AND METHOD AND APPARATUS FOR MAKING SAME
Martin M. Sternau, 67—50B 188th St., Fresh Meadows, Flushing, N.Y. 11358
Division of application Ser. No. 366,784, May 12, 1964, now Patent No. 3,402,874, which is a continuation of applications Ser. No. 591,628, June 15, 1956, and Ser. No. 653,227, Apr. 16, 1957. This application July 5, 1968, Ser. No. 810,856
The portion of the term of the patent subsequent to Oct. 3, 1984, has been disclaimed
Int. Cl. B65b 7/28
U.S. Cl. 53—42           3 Claims

ABSTRACT OF THE DISCLOSURE

A method of forming a cover on a container and simultaneously sealing the cover to the container. A sheet of heat shrinkable plastic material is placed over the mouth of the container and the temperature of the central portion is reduced while heat is applied to a portion of the film extending beyond the rim of the container, thereby selectively shrinking the film around the rim. Apparatus for performing the method is also disclosed.

---

This invention relates to the packaging art and more particularly to container closures.

This application is a divisional of my prior copending application Ser. No. 366,784, filed May 12, 1964, now U.S. Pat. No. 3,402,874, which is a continuation of my copending application Ser. No. 591,628, filed June 15, 1956, and Ser. No. 653,227, filed Apr. 16, 1957.

In general, the types of containers with which the inventive principles may be most readily and advantageously utilized are open mouth containers, the open mouth being defined by an enclosing rim formed, in many instances, by a beaded or enlarged lip. Such containers have a variety of cross-sectional configurations and shapes, and are frequently made out of paper, plastic, metal, etc. The containers are commonly utilized to package a variety of foodstuffs such as, for example, fruit, vegetables, meat, candy, bakery goods, and similar items.

In order to close such containers, specially designed closures in the form of lids, covers, caps, etc., have previously been provided. Generally, such closures have been made of relatively rigid thick materials preformed into a desired shape and size for subsequent application to the containers by association with the rim structure of the container.

Frequently, the container structure has been provided with special grooves, ribs, slots, embossments, and the like, in the rim area for association with the closure to properly hold the closure on the container and seal the container. It will be appreciated that the necessity for special closure receiving portions on the containers increases the overall size of the container required to package a given amount of goods and the amount of material required to fabricate the containers. Furthermore, the container cavity cannot be completely filled to the top of the rim since the contents must be spaced below the rim a sufficient distance to permit subsequent association of the closure with the container.

Oftentimes colsures of the type to which this invention relates have required the application of a considerable amount of force for association with the container. Consequently, the containers must be made sufficiently rigid to withstand the assembly forces thereby imposing additional limitations on the container and the goods which may be packaged therein. Similarly, for example, in the packaging of overstuffed containers care must be exercised to prevent damage to such contents as soft fresh fruit, or the like, which is easily crushed or bruised.

Closures of the type previously referred to often require rather elaborate assembly equipment as well as separate manufacturing equipment thus greatly increasing packaging costs. Furthermore, the closure material and closures must be handled and stored several times. Consequently, sanitation problems are increased and the closures are subjected to damage and contamination each time they are handled prior to application to the container.

Those skilled in the art of packaging foodstuffs, particularly frozen foodstuffs, freshly baked bakery goods, freshly picked fruit, and the like, will recognize the desirability of closure means which can be formed from basic raw material directly on the container immediately after the goods are placed in the container without requiring elaborate forming equipment or saniatry precautions.

I have discovered that the class of materials commonly identified as oriented heat shrinkable polymers are particularly well suited for the manufacture of such closures. Whereas, in the prior art, it has been suggested that closures be formed from shrinkable material, for special applications by rather elaborate equipment, I have discovered that film in the class of materials known as oriented heat shrinkable polymer film can be utilized to form closures directly on a container by relatively simple procedures utilizing relatively simple apparatus. Although the broadest aspects of the invention include the use of film material or perhaps even thicker sheet material, I have surprisingly found thin film to be of particular utility and far more advantageous in many applications.

This invention is to be clearly distinguished from the well known prior art practices relating to the formation of tamper proof bottle seals and the like. Prior art of this general type, as shown by U.S. Pat. 2,151,508, is directed to the problem of providing a band or outer cover of material around a removable and replaceable bottle cap or cork so that the bottle can be opened only by mutilating the material thus preventing unknowledgeable tampering with the contents. In other words, in the prior art, tamper proof seals have been provided in addition to a separate closure for sealing and holding the contents of the bottle. On the other hand, this invention is directed specifically to the provision of closures which in and of themselves seal the container with which they are associated and hold the goods therein.

Another type of prior art packaging practice from which the present invention is to be clearly distinguished is the encapsulation of articles by use of shrinkable materials which extend completely around the goods to be packaged in surface to surface engagement therewith to form the complete package as disclosed, for example, in U.S. Pat. 2,168,651. Such packages are generally formed by heat sealing overlapping portions of the material and then applying heat uniformly to the entire package.

Still another type of prior art practice from which the present invention is clearly distinguishable is the formation of thick strong rigid bottle caps or the like which require the use of materials having particularly high strength characteristics because of the nature of the contents of such bottles and their use. For example, the formation of bottle caps for bottling beer and carbonated soft drinks requires entirely different considerations than in the packaging of foodstuffs and the like as previously described. In such piror art practices and others, the cap is prefromed and then applied to the container as shown, for example, by U.S. Pat. 2,608,334.

While heat for shrinkage may be applied in a variety of ways, including electrical conduction apparatus, in the broader aspects of the invention, I have further discovered that the general class of materials known as oriented heat shrinkable polymers are particularly well suited to the formation of closures on the container solely by utilization of a fluid such as air at an elevated temperature to apply heat by convection. Such a fluid may be selectively applied dynamically in discrete quantities by a hot air blower, or the like, or may be applied statically by a surrounding fluid environment at an elevated temperature sufficiently high to cause shrinkage of the material to form the closure. In accordance with my invention, unformed sheets of the oriented heat shrinkable polymer film material can be used to form closures on containers by the simple expedient of positioning the material over the mouth of the container and applying heat thereto which causes shrinkage of the material and conformation to the rim structure of the container. A piece of oriented heat shrinkable polymer film material supported on the rim of a container will tend to conform to the shape of the rim of the container when shrunk. It may be readily appreciated that these concepts lend themselves to the development of methods and apparatus for forming closures having a simplicity heretofore unknown at a cost heretofore unattainable.

It will appear to the man of ordinary skill in the packaging art that the formation of a closure by the simple expedient of exposing oriented heat shrinkable polymer film material to a high temperature environment will likely result in merely a shriveled piece of film material rather than the formation of a useful closure. An obvious apparent solution might be to follow certain prior art teachings and utilize rather elaborate forming equipment to obtain a preselected preformed shape prior to the application of heat. However, many of the aforementioned problems would not be overcome and many of the aforementioned advantages would be lost. Surprisingly enough, I have discovered that closures may be formed by relatively simple apparatus through the use of a technique which I refer to as selective shrinkage. By utilizing selective shrinkage I have manufactured effective closures for containers by simply placing a sheet of unformed oriented heat shrinkable polymer film over a container, holding the unformed film only on the rim of the container, and applying heat to the film at the rim to cause shrinkage of the film at the rim. I have found that I can produce closures by this method which will create a seal at the rim of the container sufficient to hold water in the container without leakage for an extended period of time.

It will be redaily appreciated by those skilled in the packaging art that the formation of closures by my heat shrinkage techniques lends itself to mass packaging procedures to a far greater extent than any of the prior art methods and apparatus. The prior art methods and apparatus typically contemplate the utilization of a separate forming head for each closure to be manufactured. Such forming heads often comprise a die arrangement which is used to preform the closure material into the general shape desired. In many prior applications, the heat utilized in the formation of the closures by heat sealing as well as heat shrinkage has commonly been provided by electrical coils or the like embedded in associated die structure and adapted to transfer the heat to the closure material by conduction through the dies. Utilization of my invention will enable the formation of closures on a mass production basis by such simple expedients as merely passing containers with pieces of unformed film closure material positioned on the container rim through ovens or the like wherein the ambient temperature is maintained sufficiently high to cause shrinkage of the oriented heat shrinkable polymer film material and simultaneous formation of a closure and seal on the container.

In order to illustrate the many possible uses of my inventive principles, I have hereinafter disclosed various types of closures and various methods of manufacturing the closures all of which embody the more generic concepts hereinbefore outlined.

One of the objects of my invention is to provide a one-piece closure of the type hereinbefore described which is inexpensive and provides a simple hermetic seal for a container irrespective of whether the container is made of paper, plastic, aluminum, steel, etc.

Another object of my invention is to provide a multiple-part closure which illustratively comprises an inner layer of closure material for sealing and a separate outer protective layer of closure material.

In other words, the principles of my invention may be utilized to manufacture a closure from transparent oriented plastic material alone, or from two dissimilar materials with the inner component being formed of the transparent oriented plastic material and the outer component being formed of a semi-rigid moldable material, for example.

Another object of my invention is to provide a sealing closure that will permit removal and replacement. Such an arrangement also may be utilized with a two-part closure so that the outer cover may be removed for inspection of the contents of the container without removal of the inner cover and without breaking the seal provided thereby so that danger of contamination will be eliminated.

Another object of my invention is to provide a multiple-part closure, which may be a two-part closure or a three-part closure, with an inner stiffening component associated with an outer sealing component with or without further protective covering.

While a primary object of the present invention is to provide new and improved container closure means, other related objects are to provide: a container closure means, other related objects are to provide: a container closure manufactured from oriented heat shrinkable polymer film material; new and improved container closure means comprising a plurality of components at least one of which is made of oriented heat shrinkable polymer film material; a container closure manufactured from oriented heat shrinkable polymer film material and having means associated therewith to facilitate opening of the closure; a new and improved closure which has an elastic rim or edge and is removable and reappliable; a new and improved closure comprising a plurality of components at least one of which is made from transparent oriented heat shrinkable polymer film material and at least one of which provides window means through which goods in a container may be viewed through the transparent material; and a closure made from oriented heat shrinkable polymer film material having container bracing means integrally associated therewith.

Another primary object of the present invention is to provide new and improved methods of manufacturing a closure for a container and other related objects are to provide new and improved methods of: forming a closure on a container; manufacturing a hermetically sealing cover from basic raw sheet (i.e. unformed) materials directly upon the container upon which it is used and at the time of closure of the container (i.e. simultaneously with the formation of the closure from the unformed raw stock by heat shrinkage) while using the container as a male forming component for the closure; forming a closure from unformed oriented heat shrinkable polymer film material solely by direct application of heat to the material by a fluid medium; forming a closure from unformed oriented heat shrinkable polymer film material by selective shrinkage; and forming a closure from unformed oriented heat shrinkable polymer film material directly on a container by application of heat through a fluid medium in a manner causing selective shrinkage at the rim area of the container resulting in the formation of a closure solely by shrinkage of the material onto the rim of the container.

Another primary object of the present invention is to provide new and improved apparatus for manufacturing a closure for a container and other related objects are to provide new and improved apparatus for: supporting unformed oriented heat shrinkable polymer film material prior to association with a container; applying the material to a container; holding the material on the container; and selectively applying heat to the material on the container to form a closure thereon.

In general, any of the known oriented heat shrinkable polymer materials may be utilized, to a greater or lesser degree, in my invention. The selection and use of the proper type of material will vary from application to application depending upon availability, the particular packaging problem, and the personal preferences of the particular packager. Various packaging applications may require variations in the physical characteristics of the closure material thus making one type of material more suitable than another type for a particular application.

The term "oriented" is thought to be well understood in the packaging art and refers to a material which has been specially processed to obtain a high degree of molecular orientation which imparts the requisite shrink characteristics to the material. Materials of this general type are disclosed in U.S. Pats. 2,385,257, 2,497,376, 2,650,213, 2,668,403 and 2,762,720. Other types of suitable oriented heat shrinkable materials are also available and undoubtedly other types of oriented heat shrinkable materials suitable for use in my invention will be subsequently developed.

In the presently preferred embodiment of my invention, I prefer to use oriented heat shrinkable polymer film and it has been my experience that thin film is preferable. I have experimented with an oriented heat shrinkable rubber hydrochloride polymer film material known as "Snug-Pak" and sold by Tee-Pak, Inc. I have found that "Snug-Pak" material in thicknesses of about 1 mil or less produces exceptional results.

Since film material and sheet material are commonly distinguished in the packaging industry by thickness, it is my intention to adopt the distinction specified for the packaging industry in Modern Packaging Encyclopedia of 3 mils or less for film material with sheet material being thicker than 3 mils.

Furthermore, it has been my experience that fragile film is generally preferable and has the distinct advantages of, among others, being more readily conformable to the shape of the container and more easily opened on the container. Some fragile films are unable to sustain themselves in a horizontal plane under their own weight and, hence, unsupported portions of such film extending beyond the rim of a container will drape downwardly around the sides of the container without the necessity of applying forces sufficient to permanently deform the material. The term "fragile' is thought to be well recognized in the packaging industry and is generally related to the property of stiffness which is an exponential function of the thickness of any given material as well as the inherent physical properties of the material. Sometimes this property is also discussed in terms of limpness. A strong tough stiff material such as polyethylene terephthalate must be extremely thin in order to be anyway near as fragile as substantially thicker films of other materials such as, for example, polyvinylidene chloride or rubber hydrochloride. The quality of fragility or stiffness may be demonstrated by comparing 2 mil and ½ mil polyethylene terephthalate film material. It will be readily seen that the 2 mil material is far more rigid and stiff than the ½ mil material.

The aforementioned objects, and others, have been attained by utilization of the inventive principles incorporated in the illustrative embodiments of the invention shown on the accompanying drawing wherein:

FIG. 7a is a cros-sectional view of another arrangement of closure forming materials representing a subsequent rearrangement of the closure forming materials shown in FIG. 7;

FIG. 13 is a cross-sectional view of a portion of still another type of apparatus for positioning closure materials on a container and applying heat for shrinkage;

FIG. 14 is a perspective view of a closure for a container having an inspection window for viewing the contents of the container;

FIG. 15 is a diagrammatic illustration of apparatus for associating closure materials with a container;

THE CLOSURES AND CLOSURE MATERIAL ARRANGEMENTS

Figure 1:
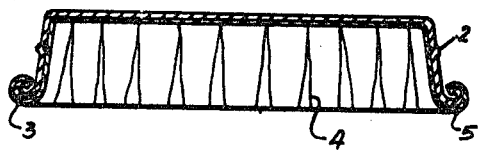
FIG. 1 is a cross-sectional view of closure materials for a multiple-part closure in an initial stage of manufacture.

It will be perceived that the inventive principles are susceptible of incorporation in a variety of closure forms. The illustrative embodiments of the invention shown in the drawings may be divided into three basic closure types which are:

(1) A closure formed from a combination of separate closure materials which are partially secured together and when shrunk form a single closure device;

(2) A closure formed from a combination of closure materials which are completely separate from one another and when shrunk form a multi-part closure; and (3) A closure formed by heat shrinkage of a single piece of unformed oriented heat shrinkable film material alone.

Multiple part closure with peripherally joined layers

In the multiple part closures, the inner or underside cover material may be made from a clear, translucent, or opaque oriented heat shrinkable film of any of the various polymer materials. The outer cover material may also be a shrinkable material or, preferably, a moldable rigid or semi-rigid material such as aluminum, paper, plastic, glass, steel, etc. The purpose of the inner material is to form a closure and provide a seal for the container on which the closure is used. The purpose of the outer cover is to provide a mold or retaining device and shield for the inner material during the formation of the closure by heat shrinkage and to subsequently provide a protecting outer cover for the inner closure.

Figure 2:
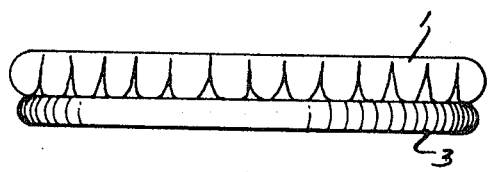
FIG. 2 is a side elevational view of the closure materials shown in FIG. 1 in a subsequent stage of manufacture.
Figure 11:
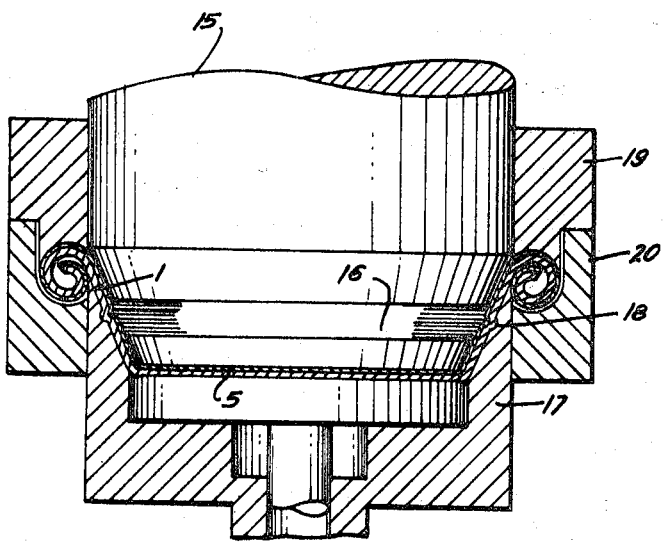
FIG. 11 is a cross-sectional view of a portion of apparatus for associating closure forming materials as shown in FIG. 1 prior to application to a container and heat shrinkage thereon.

Referring now particularly to FIGS. 1, 2 and 11, there is shown an arrangement of separate closure materials for forming a multiple-part closure having the various parts partially joined solely along the rim and apparatus for associating the closure materials. In the illustrative two-part closure example, an outer layer 1 of closure material and a separate inner layer 5 of oriented heat shrinkable polymer film closure material are associated in face to face relationship as shown. The inner layer 5 of closure material is provided to obtain a seal across the mounth of the container while the outer layer 1 of closure material is provided for protective purposes, i.e., to prevent damage to the inner sealing layer 5. Both layers of closure material may be made from the same material or the inner component may be made from heat shrinkable oriented plastic film and the outer material may be made from a semi-rigid moldable material.

The peripheral portions of the closure materials extend substantially transversely to the central portions of the closure materials to form a skirt portion having vertically extending pleats 4 and a beaded and expansible rim 3 at the bottom of the skirt portion. The bulged appearance shown in FIG. 2 is achieved by applying pressure to the central portions so that the skirt portion in the area of the crease 2, formed in the skirt area of the outer layer 1 of closure material in spaced relationship above the more or less loosely rolled edge 3 at the rim, is outwardly displaced.

The connection of the materials to one another may take place prior to or during association of the closure materials with the container. In the embodiment shown in FIGS. 1, 2, 11 and 11a, the closure materials are rolled, curled, bent or otherwise temporarily or permanently held together so that the inner closure material is held or retained by or within the outer closure material. The securing together of the closure materials is done prior to, during, or after the association of the materials with the container. The closure materials may be associated prior to application to the container by apparatus of the type shown in FIG. 11. The difference between formed and unformed material is clearly illustrated by reference to FIGS. 1 and 11. In FIG. 11, formation of the crease 18 is shown to require similar displacement of the inner thin fragile film 5. However, as shown in FIG. 1, only the relatively rigid and stiff outer cover 1 is permanently deformed whereas the inner layer 5 of thin fragile film does not have a corresponding crease and was, therefore, not formed.

Figure 18:
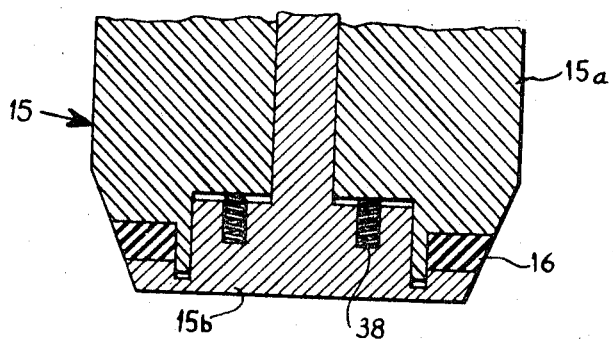
FIG. 18 is a partial sectional view of the apparatus shown in FIG. 11.

FIG. 18 illustrates the details of the male forming die 15 which comprises a pressure member 15a and a head member 15b normally separated by springs 38. In operation, the springs are compressed and the resilient member 16, being restrained on three sides, is forced outwardly against the female die in the general area of the groove of the female die. Thus a peripheral crease is formed in the side wall of the outer layer of closure material. It will be apparent that in a multiple part closure of the type shown in FIGS. 1 and 2, the innermost layer of closure material is free to move independently of the outer layer of closure material except at the rim areas which provide the only point of physical attachment.

The closure materials are thus associated in a form having, as one example, a circular top portion and in integral peripheral flange with a beaded rim. This type of device may be snapped onto a container with the beaded edge locked circumferentially below the rim of the container.

Since the rim of the inner material is rolled into the rim of the outer material, the two separate closure materials are locked and retained only at the rim area. If preferred, additionally or alternately, the closure materials may be bonded or glued to one another peripherally along the rim. This arrangement of closure materials has a beaded and expansible rim which may be snapped onto the rim of an aluminum container or the like.

Since the more or less loose roll or double fold in the rim area and the adjacent skirt portions are pleated, the associated closure materials are freely able to expand and contract as they are applied over the mouth of the container. Expansibility and contractibility of the rim portion both subsequent and prior to the formation of the closure by the application of heat is facilitated by the pleats 4 which are formed in the skirt portion of the closure materials as the skirt portions are positioned downwardly relative to the center portions. The loose roll or fold in the rim may involve a plurality of complete turns rather than one as shown. In order to facilitate association of the closure materials in the rim area, it is desirable that thin plastic film material be utilized which is relatively fragile and permits easy manipulation.

Consequently, when heat is applied to the rim of the closure materials or to the container-closure material assembly, the inner layer of film will primarily shrink a maximum distance circumferentially around the rim of the container due to more rapid heat absorption at the exposed, uncovered, and unshielded skirt portion of the film. The beaded rim will shrink circumferentially and be pulled tighter around the container. Since both elements ahe engaged at the rim area, the outer material will also be more tightly secured on the container. The film will be shrunk along the rim to conform to the shape and irregularities of the container rim creating an additional seal around the rim of the container. Due to the primary local shinkage around the rim of the container, the entire piece of inner closure material is elastically fastened or anchored at the rim of the container and the remainder of the film is pulled tightly across the mouth of the container. Consequently, the inner closure material is in constant tension resulting in further tightening and improvement of the seal at the edge of the container.

Heat is applied to effect selective shrinkage of the cover with the plastic film material shrinking a maximum amount circumferentially around the rim of the container due to the cover design. The closure materials will form a closure having the shape and configuration of the rim of the circular, rectangular, or other shape of the container. Furthermore, a leakproof seal will be created around the rim of the container.

Figure 7:
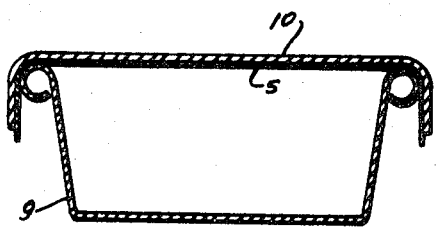
FIG. 7a is a cross-sectional view of another arrangement of closure forming materials mounted across the mouth of a container.
Figure 7A:
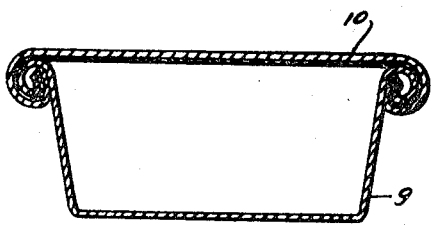
Figure 8:
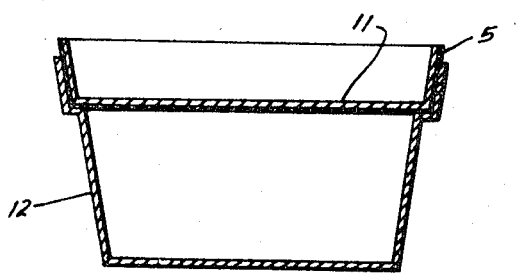
FIG. 8 is a cross-sectional view of a different arrangement of closure forming materials on a container.
Figure 8A:
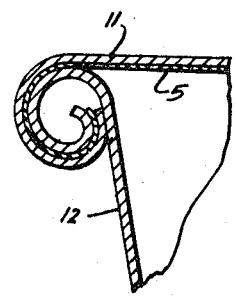
FIG. 8a is a partial cross-sectional view of a rearrangement of the closure forming materials shown in FIG. 8 in association with the container rim.

Other types of multiple part closures connected to one another solely at the rim areas are shown in FIGS. 7, 7a, 8 and 8a. FIG. 7 illustrates an inner plastic film closure material 5 and an outer protective closure material 10 placed over a container 9 and a beaded rim. Subsequently, these closure materials are associated to make a tight closure as shown in FIG. 7a. Obviously, if both materials are heat shrinkable, they may be associated by simultaneous heat shrinkage. Alternatively, the materials may be associated by a rolling operation prior to shrinkage. Then heat is applied to cause selective shrinkage around the rim. FIG. 8 shows a straight edge container 12 having an inner closure material 5 associated with a recessed outer closure material 11 which is applied over the top of the inside closure material. Subsequently, as shown in FIG. 8a, both layers of closure material and the container rim are rolled together and subjected to a subsequent heat sealing operation.

Multiple part closure with completely separate layers

Referring now to FIGS. 3–6, various forms of multiple part closures are shown in which the different closure materials are completely separate from one another. The innermost layer of closure material is made of oriented heat shrinkable polymer film material. The outermost layer of closure material may be made from moldable rigid or semi-rigid material such as aluminum, paper, plastic, glass, steel, etc., or combinations thereof. Shrinkable materials may also be used. The inner cover provides a seal for the container and the outer cover protects the inner cover. The outer cover may be preformed to the desired shape prior to association with the inner layer of closure material and placement on the container. Consequently, the preformed outer cover serves as a mold or retaining device and shield for the inner layer of unformed closure material during heat shrinkage to form the closure, and then subsequently serves as a protecting cover for the inner cover. Consequently, a multiple part closure having an elastic periphery is provided which permits separate removal and replacement of the outer cover and the inner cover whereby inspection of the contents of the container may be made without breaking the seal of the inner component.

Figure 3:
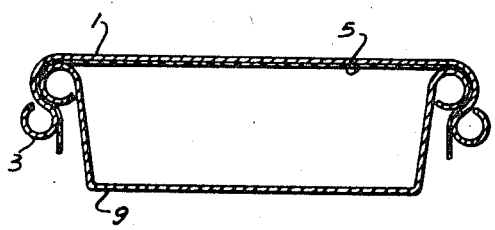
FIG. 3 is a cross-sectional view of closure materials for another type of multiple part closure on a container prior to shrinkage thereon.
Figure 4:
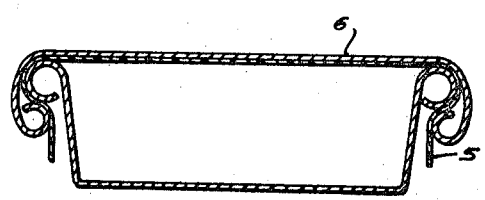
FIG. 4 is a cross-sectional view of another arrangement of closure materials for the other type of multiple part closure mounted on a container prior to heat shrinkage.

In FIGS. 3–6, the inner layer of closure material 5 may be held on the container by various types of outer covers. In FIG. 4, a single layer cover 1, which may be preformed as previously disclosed by reference to FIGS. 1, 2 and 11, is shown holding the inner layer of unformed oriented heat shrinkable polymer film across the mouth of the container with pressure being exerted on the rim to hold the film in place. The skirt portion of the film is pleated as previously illustrated in FIG. 1 and is loosely downwardly draped below the container rim as shown.

Figure 6:
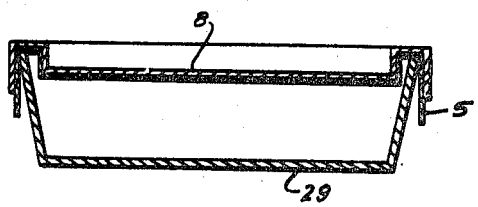
FIG. 6 is a cross-sectional view of another arrangement of closure materials for the other type of multiple part closure mounted on a container prior to heat shrinkage.
Figure 5:
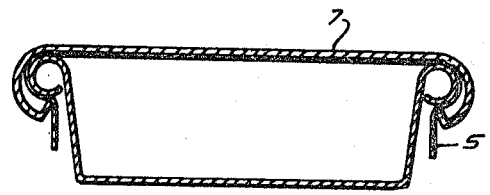
FIG. 5 is a cross-sectional view of another arrangement of closure materials for the other type of multiple part closure mounted on a container prior to heat shrinkage.

Similarly, in FIGS. 4–6, preformed outer covers 6, 7, 8 hold the unformed inner layer of closure forming material 5 on the rim of the container prior to heat shrinkage.

In an arrangement of closure materials as previously described, the heat-shrinkable film protrudes beyond the rim of the container and is held in place on the container by a retaining and shielding snap-on cover. When the container-cover-film combination is subjected to overall heat, it will be seen that the protruding exposed and unshielded portions of the film will be heated first since the other portions of the film are shielded from the heat. Consequently, the exposed skirt portion will shrink first, i.e., before the rest of the film which is shielded by the outer cover and the container, so that selective shrinkage is effected. A removable and reappliable closure having an elastic edge is thus formed.

Again, particularly advantageous results are attained by using fragile thin film on the order of 1 mil for the inner component.

One piece closure

It is also a novel feature of this invention to place a piece of unformed oriented heat shrinkable film on top of a paper, plastic, aluminum sheet or foil container; to retain and shield it by means of any outer cover; and, by subjecting it selectively to heat, to shrink it around the mouth of the container thereby forming a leakproof, dome-shaped, removable and reappliable cover.

Figure 10:
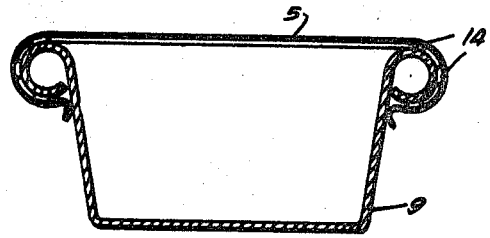
FIG. 10 is a cross-sectional view of a formed closure having additional sealing means associated therewith on a container after heat shrinkage.
Figure 9:
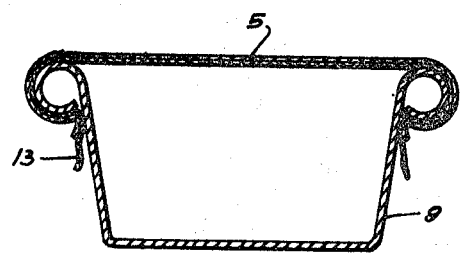
FIG. 9 is a cross-sectional view of a formed closure having associated closure opening means in position on a container after heat shrinkage.

In other words, the oriented heat shrinkable film may be used alone to simultaneously form a one-piece closure on a container and seal the container by application of heat to cause shrinkage. It will be perceived that the inner component of a multiple part closure with completely separate layers is in fact a one-piece closure of the type now being referred to. FIGS. 9 and 10 show a formed one-piece closure on a container, the pleated skirt portion of the oriented heat shrinkable film material having been shrunk inwardly onto and around the container rim and the sidewall.

It is, therefore, clearly apparent that I have invented a new and improved closure which is extremely sanitary in use and which will decrease the quantity of container material required to pack a certain amount of goods. The reduction in container size is made possible because of the fact that the present closure extends across the top of the container without extending therein. In prior art devices of the ordinary inside friction type, the closures are sealed on an inwardly extending rib located beneath the top of the container. Consequently, approximately 8% of the normal capacity of the container is often wasted. By utilizing a flexible transparent film across the very top of the container the entire container may be utilized. Such an advantage is particularly applicable in aluminum packaging which is becoming so common today.

Closure with tear means

Referring again to FIG. 9, the single piece closure 5 is shown to have an opening string located beneath it and extending over the rim of the container downwardly beyond the peripheral edge of the closure. Any of the covers may have a means of tearing or otherwise removing the sealed film cover incorporated therewith. A string, band, etc. 13 may be incorporated into the cover construction prior to or during the sealing operation.

Closure with additional sealing means

FIG. 10 shows a one-piece closure 5 with additional sealing cement, wax, or other bonding media 14 located at various spots, or continuously, around the edge of the closure or container. The sealing cement may be applied to the other constructions.

It will be understood that the additional sealing means is not generally necessary, but if desired, it will adhere to the shrinking or shrunken film during the heat sealing operation and thereby provide double protection against leakage. A properly selected wax, heat sensitive cement, or heat softening material, can be applied so that, when heat is applied, the wax will melt simultaneously with the shrinking of the film, the film enveloping the rim of the container and the melting wax being drawn by capillary action into any surface irregularities at the rim of the container to therewith form or assist in forming a leakproof seal.

Closure with window

Referring now to FIG. 14, a multiple part closure comprising an inner layer of transparent oriented heat shrinkable film and an outer protective cover having a viewing window is shown. Consequently, the outer cover 30 is provided with a hole 31 in the center for visual inspection through the transparent inner cover 5. The ability to use transparent closures facilitates merchandising of foodstuffs because the public is able to see the contents of the packages.

Closure with attached stiffening means

Another object of this invention is to provide a two-part or three-part closure comprising an inner stiffening component attached to an outer sealing closure component with or without a further protective covering for the sealing closure component. The use of a stiffening component will reduce the cost of manufacture of the container by reducing the amount of container material required.

Figure 16:
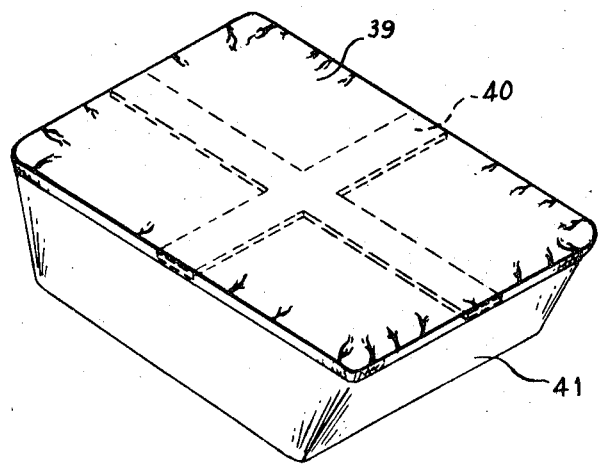
FIG. 16 is a perspective view of a closure with attached stiffening means on a container.
Figure 17:
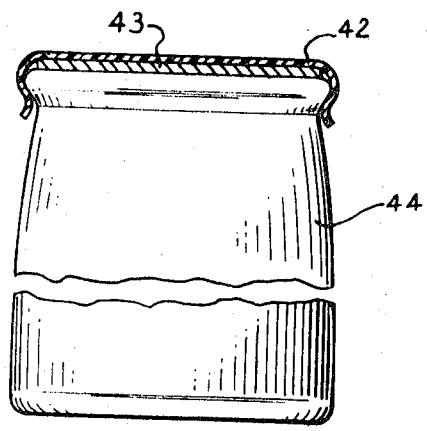
FIG. 17 is a side elevational view, partly in section, of another closure with attached stiffening means.

FIGS. 16 and 17 show closures having stiffening elements which are used to reinforce the rim of the container with which the closures are associated. In these modifications, an oriented heat shrinkable polymer film closure material is provided with an integrally attached inner layer of stiffener material comprising a moldable or rigid material such as cardboard or plastic which may be suitably attached to the heat shrinkable film. The inner stiffening member 40 is designed to fit inside the container rim, as for example in FIG. 16, and when heat is applied the closure material 39 will shrink around the rim of the container 41 as previously described to form a sealing closure. The cardboard, plastic, etc., inner layer will act as a stiffener or brace for both the closure 39 and the container 41. Such an arrangement is of particular advantage on oblong containers where the long side of the container rim and adjacent side wall may tend to buckle under the tension of the shrink film. In such cases, the stiffener will prevent deformation of the container. The reinforcement 43 may lie over the rim of the container 44 as shown in FIG. 17 in which case it will stiffen only the plastic closure 42 and not the container proper. The stiffeners may be shaped in the form of a single rib, cross, disk, or any other suitable configuration. Obviously, additional layers of closure material may be provided to obtain an outer protective cover if desired.

METHODS OF MANUFACTURING THE CLOSURES

Applying the unformed closure material

Figure 12:
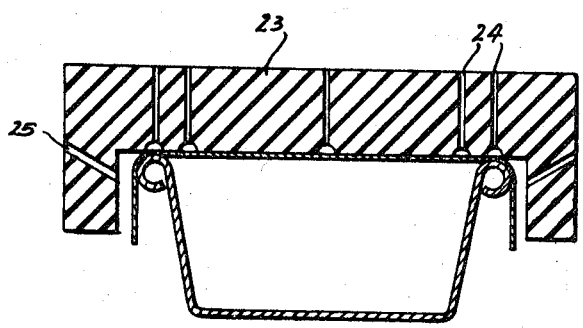
FIG. 12 is a cross-sectional view of a portion of another type of apparatus for positioning closure forming materials on a container and for applying heat to form the closure on the container by heat shrinkage.

One of the major advantages of the present invention is that the unformed closure material may be purchased from the manufacturer in rolls of basic raw sheet form material as indicated at 34, 36 in FIG. 15 and directly applied to the container without any subsequent forming operations expect for severance of suitable lengths of the material by severing apparatus 37. If a one-piece closure of the type shown in FIG. 12 is to be formed, only a single length of material 33 will be brought into position above the container 32. If a multiple piece closure is to be formed, then one or more additional lengths of material 35 may also be simultaneously positioned across the top of the container 32.

One or more of the severed lengths of material 33, 35 are located across the open mouth of the container with the peripheral portions which extend beyond the container rim positioned downwardly around the sides of the container to provide a peripheral skirt portion. The amount of drape and ease of positioning, obviously, is dependent upon the stiffness of the material. I prefer to use a material which is sufficiently fragile so as to permit the material to relatively easily acquire a draped pleated condition around the rim of the container. If the material is sufficiently fragile it may have considerable drape solely by reason of its own weight under the influence of gravity. Furthermore, the material may also be blown downwardly inwardly by the dynamic application of hot air for shrinkage. Actually, it may not be absolutely necessary that a draped condition be obtained in every application, but a thin fragile material does facilitate subsequent formation of the closure and lends itself to high speed production methods.

Holding and shielding the unformed closure material

When the length of material 33, for example, in a one-piece closure, is placed across the open mouth of the container 32, suitable holding means such as the plate 28 shown in FIG. 13 may be used to hold the material on the rim of the container. The plate 28 serves both to hold the unformed closure material on the container and to provide shielding means preventing direct application of heat to the central portion of the closure material extending across the mouth of the container.

An alternative method of holding closure material on a container rim is illustrated in FIG. 12 wherein a piece of limp, fragile, thin film made from a suitable oriented heat shrinkable polymer material is positioned on a container having a beaded rim portion and held and shielded by die apparatus 23. The unformed film material is sufficiently limp and fragile so as to easily acquire the position shown when located on the container wtihout application of any force resulting in permanent deformation of the film material. In other words, if the die 23 were removed, the film material could be removed from the container and would be exactly the same as it was before it was positioned on the container without having suffered any permanent deformation whatsoever. The unformed film material, when associated with a container, includes a central portion extending across the mouth of the container and a skirt portion which extends downwardly around the sides of the container.

If a piece of unformed film material, such as the piece of film shown in FIG. 12, is positioned across the mouth of a container with the peripheral portion extending downwardly to form a skirt, the skirt portion will be arranged in a plurality of pleats 4 similar to the arrangement shown in FIG. 1 whereat a piece of film 5 has substantially the same configuration. In other words, when a piece of film is arranged to provide a skirt portion without permanent deformation or shrinkage, that skirt portion of necessity must be arranged in pleats around the container.

It will be readily appreciated that the holding and shielding function performed by the apparatus shown in FIGS. 12 and 13 can equally well be performed by an outer closure in combination with an inner closure of unformed oriented heat shrinkable polymer film material. For example, in the arrangements of FIGS. 3–6, a two-part closure is shown in which unformed oriented heat shrinkable closure material 5 is held on containers by an outer layer of formed closure material and is shielded thereby. The skirt portion of the unformed film hangs downwardly without permanent deformation until heat is applied for shrinkage. When the heat is applied, only the exposed portions of the skirt portion of the film are directly exposed thereto and the central portion of the film is held on the container rim and shielded by the outer cover. Consequently, selective shrinkage is attained. It may be noted that the central portion of the oriented heat shrinkable closure material is loosely positioned relative to the outer closure material so that the inner closure material may be stretched tautly across the mouth of the container regardless of the position of the outer closure material.

Similarly, the holding and shielding function is also provided by the outer cover in a two-part arrangement comprising a plurality of layers of separate closure materials joined solely at their peripheries, as shown in FIGS. 1 and 2. The central portions of the inner closure materials, which are only loosely associated so that the inner oriented heat shrinkable polymer material may move relative to the outer material to establish the desired sealing condition around the rim of the container, are shielded by the outer cover and the skirt portions are exposed.

Applying the heat for shrinkage

Figure 11A:
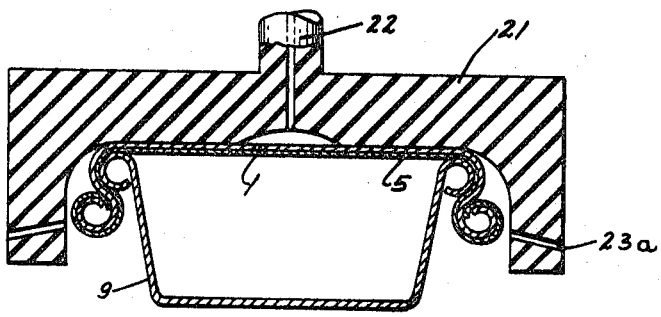
FIG. 11a is a cross-sectional view, with parts removed, of apparatus for applying closure materials to a container and for applying heat to form the closure on the container by heat shrinkage.

The heat may be selectively applied to the exposed portions of the skirt, which may be a narrow band of the skirt as shown in FIG. 3 or 11a, or the entire skirt as shown in FIG. 12, of the closure material by any suitable means such as the heat application means 27 shown in FIG. 13, the heat application means 25 shown in FIG. 12, or the heat application means 23a shown in FIG. 11a. The heat may also be applied by any other suitable means such as by the creation of a suitable high temperature ambient condition having a temperature sufficiently high to cause heat shrinkage of the exposed portions of the oriented heat shrinkable polymer material. Although the application of heat by convection through a fluid medium is preferred, any heat means such as hot air, hot water, steam, electricity, or even an open flame may be used in some applications.

Selective shrinkage

By applying the heat selectively to the skirt portion of the oriented heat shrinkable polymer film material, while holding the top portion of the film on the rim of the container and shielding the top portion, the skirt portion is caused to shrink first and to a greater extent inwardly against the container around the rim portion while bringing the portion of the film material on the rim into extremely close surface to surface engagement with the container rim. Subsequently, the center portion of the closure material may be subject to an application of heat to cause further shrinkage of the center portion resulting in tightening thereof and in drawing the film material into tight sealing engagement around the entire periphery of the container. In this manner, a taut closure having an extremely pleasing appearance may be manufactured.

In any event, the essential conditions for selective shrinkage on an open mouth under-stuffed container are that the film be held on the container rim substantially flat across the mouth of the container while the edge of the film is arranged around the rim of the container in pleats. When heat is applied to the rim area of the container the protruding film will shrink and will conform to the shape of the rim of the container. Hence, a tight seal is formed around the rim while the remainder of the rim is pulled tightly across the mouth of the container or the contents therein. If additional heat is subsequently applied over the entire area of the closure further tightening of the closure material will result and the seal will be improved. Such a method has the advantage that the outer covers, in the case of a two-part closure, can be removed without disturbing the seal of the film portion of the closure. Furthermore, the outer cover can be repeatedly taken off and snapped back onto the container without losing its original tightness and tension due to the expandible pleated rim.

Therefore, the concept of selective shrinkage of shrinkable film or the like may be defined as the controlled reduction in size of portions of the film to a substantial degree while holding the reduction in size of the balance of the film to a lesser degree or to none at all. Such a concept applies to all of the closures hereinbefore described by reason of the fact that sufficient shrinkage of the film at the rim of the containers is first obtained to form the closure and provide a seal at the mouth of the container while controlling shrinkage across the mouth of the container through the retention of the film at the rim and by shielding or the like.

Closure tension and elasticity

One of the objects of my invention is to make an improved closure in which the rim is pleated before being formed in such a manner that elastic expansion and contraction at the rim area may occur to enable the closure to be applied to and removed from a container whereon the closure is held by locking the rim of the closure below a slightly larger bead on the mouth of the container.

Another object of my invention is to provide a closure which will accept, respond, and reshape itself to conform to deforming forces upon the container, closure, or upon both, without damage to or loss of the seal originally obtained.

One of the advantages of the present invention is that a piece of oriented heat shrinkable polymer material which has heat selectively applied to a pleated skirt portion will have sufficient elasticity and resilience to permit the closure, formed by the application of heat to cause shrinkage, to be removed from and reapplied to the rim of a container.

Such a closure will deform due to reduced or increased pressures without damage to or loss of seal thereby reducing the hazard of deformation or breakage of the container due to varied pressures. Such a closure will also materially strengthen the container upon which it is utillized by resisting deformation and shock.

Closures embodying a heat shrinkable material as heretofore described will impart added strength and rigidity to the container, closure, and seal by utilizing physical forces that are developed by shrinkage of the film. The film, upon being tightened during shrinkage, is in a state of tension. In such a condition, active radial compressive forces are created upon the rim of the container which cause reactive expansive outward forces. A stable equilibrium is established between these forces and in consequence whereof added rigidity is imparted to the closure, the container, and the seal.

Therefore, a disclosure made in accordance with the principles of the present invention creates a seal that permits a wider degree of crushing or deformation of the container than heretofore permissible with other closures. This is evidenced by the fact that a crushing action on the container closure arrangement is accompanied by a corresponding contraction in the shrunken film material due to inherent tension which tends to reduce the size of the film at any and all times when the restraining force provided by the rim is reduced or relaxed. Thus, changes in shape of the rim may be accommodated without damage to the seal originally effected. It will also be apparent that a closure including a layer of outer protective closure material further protects the seal and, even though the outer layer may be damaged, the seal will remain intact. Such an advantage is obtained because the inner layer of film closure material is free to move independently of the other layers.

Thus the closure tends to retain its effectiveness despite abuse which causes deformation of the container and the cover, or changes in pressure due to changes in temperature of the food or other contents, or changes in atmospheric pressure due to the mode of shipment or storage (air transportation used by military forces in the Tropics or Polar regions, etc.).

Closure for frozen goods

The present invention is particularly well suited for packaging of frozen foods. A single layer of oriented heat shrinkable polymer film material may be utilized to form the closure on a container of frozen goods, the frozen goods being utilized to maintain the central portion of the closure material at a reduced temperature relative to the rim portion so that selective shrinkage is attained.

For example, in forming a closure on containers containing frozen foods, the seal may be made by passing the container covered by the closure material through a heated oven. The container and central portion of the closure material will be at a lower temperautre due to the frozen contents and a greater amount of time and/or heat will be required for the central portion to reach the shrinkage temperature. The rim area, which is capable of most rapid heat absorption, will reach the shrinkage temperature first.

APPARATUS

Referring now to FIGS. 11, 11a, 12, 13, 15 and 18, apparatus which may be used in making the aforedescribed closures is illustrated.

FIG. 11 shows a male die 15 (illustrated in greater detail in FIG. 18) having a resilient ring 16 located therein. A female die 17 has a groove 18 located opposite the resilient ring 16 in the male die. When pressure is applied by the male, or forcing die, the closure material 1 being formed is forced into the groove by means of the elasticity of the resilient material to form a crease. Although the closure material 5 is also laterally displaced, a permanent crease is not formed in it as shown in FIG. 1. At the same time, curling rings 19, 20 roll the closure materials at the rim. The resilient ring 16 may be omitted if desired, but then a less pronounced crease will be formed.

FIG. 12 shows a type of suction sealing disk or head 23, having film holding suction and positioning lines 24 in it. Suitable means are of course provided to support the container and to move the head 23 into position on the containers such as shown, for example, in U.S. Pat. No. 2,732,116. FIG. 12 shows only a shrinkable film placed over the container for forming and sealing thereon by means of hot air or steam passing through apertures 25 simultaneously or separately. Hot air may be applied through the apertures at the side first and then through the aperture at the top or in certain cases the hot air may be applied through the side and at the top simultaneously. Obviously, any number and spacing of holes through which the hot air is applied may be used around the sides and around the top. The sealing head or disk is equally applicable for use with the multi-part type closures.

FIG. 13 shows another type of sealing device 26 having hot air apertures 27 therein and utilizing a hold down plate 28 to hold the closure material in place on the container rim and to provide a shield for the central portion.

FIG. 15 shows rolls of basic raw sheet material 34, 36 which may be directly applied singularly or in combination to the container 32, the container being used as the male forming component of the closure.

If two strips of material 33, 35 are being used, the roll 36 would represent outer protective material 35 and the roll 34 would represent inner transparent thin oriented heat shrinkable polymer film 33. The container 32, of course, can be of any shape, circular or rectangular, for example, and is illustratively shown to have straight non-beaded sides although containers with beaded rim portions are equally well applicable. A shear 37 is provided to cut the layers of material. If desired, a suitable heat sealing device, for example as shown in FIG. 13, may be cooperatively associated with the shears so as to provide a one motion operation for sealing a container from basic sheet material. When making a multiple part closure the closure materials may be associated by rolling them into a single roll by a prior operation.

THE CLOSURE MATERIAL

My invention is particularly applicable with oriented heat shrinkable polymer films which are normally less than 2 mils (.002″) thick and capable of large shrinkage in all directions parallel to the film surface. Actually, thin films in the range of .0002″ (20 gauge) to .0008″ (80 gauge) are generally most satisfactory. The exact thickness of the film will depend somewhat upon the area and goods to be covered. Where a fragile film is required the stronger materials such as nylon should not exceed about 1 mil in thickness.

It is within the scope of my invention to use a biaxially oriented film as well as a film that is shrinkable in only one direction and may have particular utility on containers of particular form such as on rectangular containers.

Examples of certain films which may be used are oriented films of rubber hydrochloride (oriented plyofilm such as Snug-Pak) or vinylidene chloride (oriented Saran or Cryovac film). Such films are heat shrinkable by reason of their oriented internal structure. Orientation is commonly induced by stretching the film unidirectionally or multidirectionally while heated or super cooled. The orienting of such films is conventionally done by mechanical, pneumatic or other physical methods of expanding or stretching the films and may also be done by chemical, electrical or other means for realigning the molecular structure.

By way of example, especially good seals may be obtained on containers having circularly shaped mouths by the use of oriented heat shrinkable plastic film material capable of linear shrinkage of 50% in all directions parallel to the film surfaces. Such films shrink at temperatures of approximately between 160° and 220° Fahrenheit. One type of such material is the commercially available Snug-Pak of 40, 50 and 60 gauge as sold by Tee-Pak, Inc. This film is stretched to twice its width and to twice its length whereby the area is quadrupled and subsequent shrinkage results in a reduction of approximately ¼ of the original stretched area. "Plyofilm" made by Goodyear Tire and Rubber Company, for example, may be stretched appreciably more or appreciably less and consequently will be capable of shrinking more or less than standard Snug-Pak. The percentages of shrinkage in temperatures given are by way of illustration only and may be varied within wide limits. Obviously, the shrinkage temperature may also be varied for different heat shrinkable films. However, in all or practically all of the known oriented films, the shrink action will take place instantaneously or almost instantaneously.

Films possessing the above-mentioned overall shrinkage properties are desirable in many instances in order to produce adequate tightness of seal at the rim of the container where the greatest degree of utlization of the shrinkage property is required. It is to be understood, however, that the shrinkage values do not represent the overall reduction in size of the entire film in the closure after heat application, nor the actual shrinkage required to produce the seal.

The selection of films of suitable shrinkability, suitable shrinkage temperature, and suitable strength will be dictated primarily by the nature of the container or the contents and the temperatures to which the local area may be heated at the time the closure is to be formed.

While I have referred to the film as being transparent, since that quality would be most desirable in the food packaging field, it is of course understood that a translucent, opaque, or colored film might also be used. A film may be colored by integral association of a siutable coloring medium or the coloring may be separately applied to one or both of the side surfaces of the film. Also the film may be a single film or a laminated film of two or more plies of material which are integrally associated throughout their length in permanent surface to surface engagement. The principal requirement in a laminated integrally associated closure material is that at least one of the plies of the material be heat shrinkable and that the heat shrinkable ply control the overall action of the laminated material.

What I claim is:

1. A method of forming a cover upon a container and simultaneously sealing said container comprising the steps of:
   (a) placing an unformed sheet of heat shrinkable, oriented, thin plastic material over the mouth of said container so that said sheet contacts at least the rim portion of said container mouth, said sheet being substantially larger than the opening of the mouth so that it will extend beyond said mouth; and,
   (b) reducing the temperature of the central portion of said sheet while
   (c) applying heat to said sheet whereby the rim area and that portion of the film extending beyond the rim selectively shrinks and forms a closure, the central portion of the sheet remaining relatively unshrunken due to its reduced temperature.

2. The method of claim 1 wherein the step of applying heat is by passing the sheet-covered container through a heating oven.

3. The method of claim 1 wherein step (b) is accomplished by providing a container filled with frozen food.

References Cited

UNITED STATES PATENTS

| | | | |
|---|---|---|---|
| 3,344,912 | 10/1967 | Sternau | 229—43X |
| 3,348,358 | 10/1967 | Sternau | 53—42 |
| 3,411,265 | 11/1968 | Carpenter et al. | 53—42 |
| 2,976,655 | 3/1961 | Dreyfus et al. | 53—42 |
| 3,017,729 | 1/1962 | Cheeley | 53—27 |

THERON E. CONDON, Primary Examiner

H. M. CULVER, Assistant Examiner

UNITED STATES PATENT OFFICE
CERTIFICATE OF CORRECTION

Patent No. 3,555,769        Dated Jan. 19, 1971

Inventor(s)   Martin M. Sternau

It is certified that error appears in the above-identified patent and that said Letters Patent are hereby corrected as shown below:

On page 1, column 1, in the second line immediately below the title after the zip code, "11358", insert: -- assignor to W. R. Grace & Co., a corporation of Connecticut --.

Signed and sealed this 17th day of August 1971.

(SEAL)
Attest:

EDWARD M. FLETCHER, JR.
Attesting Officer

WILLIAM E. SCHUYLER, JR.
Commissioner of Patents